(12) United States Patent
Fan et al.

(10) Patent No.: US 7,574,215 B1
(45) Date of Patent: Aug. 11, 2009

(54) SYSTEM AND METHOD FOR DISTRIBUTION OF GPS SATELLITE INFORMATION

(75) Inventors: Rodric C. Fan, Fremont, CA (US); Per K. Enge, Mountain View, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 520 days.

(21) Appl. No.: 09/707,326

(22) Filed: Nov. 6, 2000

(51) Int. Cl.
*H04Q 7/20* (2006.01)

(52) U.S. Cl. ................. 455/456.1; 455/456.3; 455/457; 455/12.1; 455/427

(58) Field of Classification Search ................. 455/456, 455/457, 456.1, 426.1, 426.2, 12.1, 456.3, 455/456.5, 456.6, 427, 422.1; 342/357.02, 342/357.01, 357.12; 701/213, 214, 215, 701/207
See application file for complete search history.

(56) References Cited

U.S. PATENT DOCUMENTS

| | | | | |
|---|---|---|---|---|
| 5,608,410 A * | 3/1997 | Stilp et al. | ................... | 342/387 |
| 5,621,646 A | 4/1997 | Enge et al. | ................... | 364/449 |
| 5,793,813 A * | 8/1998 | Cleave | ................... | 375/259 |
| 5,913,170 A * | 6/1999 | Wortham | ................... | 455/457 |
| 5,926,133 A * | 7/1999 | Green, Jr. | ................... | 342/363 |
| 5,945,948 A * | 8/1999 | Buford et al. | ................ | 342/457 |
| 5,959,577 A * | 9/1999 | Fan et al. | ................ | 342/357.13 |
| 6,067,484 A * | 5/2000 | Rowson et al. | ................ | 701/16 |
| 6,104,338 A * | 8/2000 | Krasner | ................. | 342/357.06 |
| 6,122,520 A * | 9/2000 | Want et al. | ................ | 455/456.2 |
| 6,222,483 B1 * | 4/2001 | Twitchell et al. | ........ | 342/357.09 |
| 6,380,890 B1 * | 4/2002 | Smith et al. | ............. | 342/357.09 |
| 6,389,291 B1 * | 5/2002 | Pande et al. | ............... | 455/456.5 |
| 6,473,030 B1 * | 10/2002 | McBurney et al. | ...... | 342/357.03 |
| 6,529,159 B1 * | 3/2003 | Fan et al. | ................ | 342/357.09 |
| 6,560,534 B2 * | 5/2003 | Abraham et al. | ............ | 701/213 |
| 6,583,756 B2 * | 6/2003 | Sheynblat | ............... | 342/357.02 |
| 6,587,789 B2 * | 7/2003 | van Diggelen | ............... | 701/213 |
| 6,603,977 B1 * | 8/2003 | Walsh et al. | ................... | 379/45 |
| 6,611,756 B1 * | 8/2003 | Chen et al. | ................... | 701/213 |

FOREIGN PATENT DOCUMENTS

| | | | |
|---|---|---|---|
| EP | 874248 A2 | * | 10/1998 |
| EP | 1148344 A1 | * | 10/2001 |
| WO | WO 9954753 | * | 10/1999 |
| WO | WO 9956144 | * | 11/1999 |
| WO | WO 9956145 | * | 11/1999 |

* cited by examiner

*Primary Examiner*—Sujatha Sharma

(57) ABSTRACT

A positioning information distribution system for distributing positioning information through a data network is described. In one embodiment, the system distributes satellite information from a global positioning system (GPS). The system includes an information processing station connected to a data network accessible by wireless communication, a receiving station including a GPS receiver, and a mobile unit including a GPS receiver and a wireless receiver. The information processing station collects GPS satellite information from the receiving station and transmits the satellite information to the mobile unit using wireless communication. Alternately, a network of receiving stations are provided. The mobile unit can obtain the satellite information from the information processing station for determining its measured position, even when the mobile unit is roaming in an urban area and is not able to observe the GPS satellites for the lengthy observation period needed to acquire the satellite information itself.

67 Claims, 3 Drawing Sheets

SYSTEM AND METHOD FOR DISTRIBUTION OF GPS SATELLITE INFORMATION

BACKGROUND OF THE INVENTION

1. Field of the Invention

The invention relates to a system and a method for distributing positioning information of a positioning system, and more particularly to a system and a method which uses a data network, such as the Internet, to distribute global positioning system (GPS) satellite information to roving GPS receivers.

2. Description of the Related Art

The Global Positioning System (GPS) includes approximately twenty four satellites each orbiting the earth at a substantially constant speed and altitude. In the GPS system, each satellite sends out, at precisely synchronized times, a code sequence which identifies the satellite. Specifically, the code sequence transmitted by each satellite is a precisely timed binary pulse train including a C/A-code (Coarse Acquisition Code) for civilian use and a P-code (Precision Code) for military use. The code sequence transmitted by each GPS satellite contains a unique C/A-code identifying the satellite. The chipping rate of the C/A-code sequence is 1 million bits per second and repeats every one one-thousandth of a second.

Besides transmitting the C/A-code and the P-code sequences, the GPS satellites also transmit a 50-bit-per-second GPS navigation message data stream superimposed on the C/A-code and the P-code pulse trains. The GPS navigation message transmitted by each GPS satellite includes information defining the orbital location, clock and status of the satellite. The data stream of the GPS navigation message is divided into 30-second frames. Each frame is further divided into five 6-second subframes. The first subframe (Subframe 1) contains the satellite clock correction factor. The second and third subframes (Subframes 2 and 3) contain the orbital parameters (also called the ephemeris constants) defining the current orbit of the satellite. In the present description, the term "ephemeris information" or "ephemeris data" is used to refer to the ephemeris constants or the orbital parameters of the GPS satellites contained in the GPS navigation message. The fourth subframe (Subframe 4) of the GPS navigation message contains messages such as the satellite health status information and the ionospheric distortion in the atmosphere. The fifth subframe (Subframe 5) contains an almanac of the GPS satellite constellation.

One common application of the GPS system is position determination. The position determination result of a GPS system is superior to other positioning mechanisms, since it is not affected by weather conditions to the same extent as other positioning mechanisms. Further, since no ground stations are typically involved in GPS positioning, a navigation system based on GPS has unlimited range. In summary, GPS positioning information is available 24 hours per day at all locations worldwide.

A GPS receiver determines its position by first finding the GPS satellites that are above the horizon at the moment. Then, the receiver acquires the code sequences and the ephemeris information from four or more GPS satellites in view. To locate the satellites that are above the horizon, a GPS receiver, having no knowledge of the GPS satellite constellation, typically has to search through a predefined range of frequencies to tune into the GPS satellite signal. Because of Doppler effect, the satellite signal may not appear exactly at the two predefined L-band frequencies assigned for GPS satellites. The GPS receiver has to search through a frequency range to tune into the GPS signals. Simultaneously, the GPS receiver must search through all time shifts of the 24 C/A-codes to find the C/A-code that matches those contained in the received signal. In this manner, the GPS receiver finds and identifies the four or more satellites in view. Of course, a GPS receiver may have in memory a last known position and last known GPS almanac information based on a previous position determination. In that case, the GPS receiver can use the stored information as estimates to locate the satellites most likely to be above the horizon at the moment. The process of locating the GPS satellites in view can be time-consuming, particularly when the receiver does not have prior, useful positional or GPS almanac information.

After finding the GPS satellites in view, the GPS receiver proceeds to acquire the time of arrival information and the ephemeris information from four or more GPS satellites. The time of arrival information is obtained by correlating a replica of the expected code sequences with the received code sequences. Typically, a binary pulse train from a GPS satellite takes about one-eleventh second to arrive at a receiver on the ground. Using the time of arrival information, the GPS receiver computes the signal travel times and the pseudo-range information to each satellite. The GPS receiver uses a trilateration technique to obtain a "measured" position of the receiver. The measured position typically refers to the three-dimensional position coordinates including the longitude, the latitude and the altitude of the receiver. In some situations, only the two-dimensional position coordinates are of interest and in those cases, a GPS receiver only needs to acquire GPS signals from three GPS satellites for position determination. To perform trilateration, the GPS receiver operates on the pseudo-range measurements based on the acquired code sequences from four or more GPS satellites and the ephemeris information of the same four or more satellites at the time the acquired code sequences were transmitted. Because the ephemeris information are contained in two subframes of the GPS navigation message data stream, an acquisition time of at least 12.5 seconds is needed for a GPS receiver to acquire the necessary ephemeris information for the GPS satellites. Thus, a GPS receiver must be remain in clear line-of-sight of the GPS satellites for at least 12.5 seconds to enable the receiver to acquire the necessary ephemeris information. In practice, the GPS receiver needs to observe the GPS satellites for an even longer period of time because the GPS receiver may need other satellite information contained in the navigation message. Because the navigation message is updated every 30 seconds, an observation period of at least 30 seconds is needed for the GPS receiver to acquire the entire navigation message.

Although this lengthy acquisition time poses no problem for GPS receivers mounted on aircraft or used in geological or archaeological expeditions where the receivers remain mostly exposed to the open sky, the 12.5-second acquisition time for ephemeris information can become a problem for GPS receivers mounted on roving mobile units traveling in an urban environment, particularly where the area is densely built. Presently, typical GPS applications include GPS receivers mounted in vehicles or contained in cellular telephones. In these applications, the GPS receivers can only observe the GPS satellites intermittently. These roving GPS receivers typically cannot maintain contact with any GPS satellite for the lengthy observation period required to acquire the entire navigation message. For instance, the navigation message of the GPS signals only updates every 30 seconds and a GPS receiver must maintain a direct line-of-sight with a GPS satellite for at least 12.5 seconds to acquire the ephemeris information portion of the navigation message. For example, a user in a vehicle equipped with a GPS navigation system may wish to determine his position while traveling among highrises in a city center. The only time the user's GPS receiver can come in contact with the GPS satellites is when the user's vehicle is crossing an intersection which is typically less than 12.5 seconds. Because the time a GPS receiver in a roving vehicle comes in contact with the GPS satellites is limited and often less than 12.5 seconds, the GPS receiver of a roving vehicle cannot acquire updated ephemeris information needed to accurately determine its current position. The same is true for a user carrying a GPS receiver while roaming inside a building where the GPS signals are either obstructed or weak at best. To operate his GPS positioning system, the user must remain in an open area for at least 12.5 seconds so that the receiver can obtain the ephemeris information necessary to calculate its position.

One proposed solution is to install stationary GPS receivers at each of the base stations of a cellular network. The base station GPS receivers receive and retain updated ephemeris information for the GPS satellites within its view. The updated ephemeris information is then transmitted to roving GPS receivers in the vicinity of the base stations. However, this implementation has several limitations. First, the roving GPS receivers must be physically close to a stationary GPS receiver to obtain the ephemeris information for the same set of GPS satellites in view. Thus, the range of the base station GPS receivers is limited. Second, the base stations are vulnerable to radio frequency interference or hardware failures. If only a single or a few base stations are deployed, interference or malfunctions at one base station can mean an overall system failure. Third, special software must be installed on each base station GPS receivers to facilitate transmission of ephemeris information, adding to the implementation expense.

Thus, it is desirable to provide a method for distributing GPS satellite information from GPS satellites to roving GPS receivers not able to remain in contact with GPS satellites for a sufficient amount of time to acquire the necessary information.

SUMMARY OF THE INVENTION

According to the present invention, a positioning information distribution system includes an information processing station connected to a data network accessible by wireless communication. The information processing station includes a database. The system further includes a receiving station including a positioning system receiver and a transmitter. The positioning system receiver receives positioning information from a positioning system and the receiving station transmits the positioning information to the information processing station via a data link for storage at the database. The system also includes a mobile unit including a positioning system receiver and a wireless receiver. The mobile unit receives the positioning information from the information processing station via the data network.

In one embodiment, the positioning system is the global positioning system (GPS) and the positioning system receiver is a GPS receiver. Also, the positioning information is GPS satellite information including the ephemeris information and other navigation information transmitted by the GPS satellites. In this embodiment, the information processing station makes the GPS satellite information available to a roving mobile unit using wireless communication by broadcasting the satellite information through the data network. Alternately, the information processing station transmits the satellite information through the data network upon demand from the mobile unit via a wireless communication channel.

The mobile unit, wishing to determine its position, locates the GPS satellites above the horizon using satellite information transmitted by the information processing station through the data network. The mobile unit then acquires the time of arrival information from three or more GPS satellites and acquires the ephemeris information for the same GPS satellites from the information processing station through the data network. Thus, the roving mobile unit can perform trilateration to determine its position even when the mobile unit is roaming in an urban area or is indoor where the GPS signals may be weak or obstructed. The roving mobile unit does not need to maintain contact with the GPS satellites for a lengthy observation period to acquire the necessary GPS satellite information itself.

In another embodiment, a network of receiving stations is provided to increase the service area and reliability of the satellite information distribution system. For instance, a network of GPS receiving stations can be provided to acquire GPS satellite information from all of the 24 GPS satellites in the earth's orbit. The satellite information is collected and stored in the information processing station where the GPS satellite information can be distributed through a data network, such as the Internet, to a large number of users located over a wide geographic areas.

The present invention is better understood upon consideration of the detailed description below and the accompanying drawings.

DETAILED DESCRIPTION OF THE INVENTION

According to one embodiment of the present invention, a GPS satellite information distribution system collects GPS satellite information from GPS satellites using a GPS receiving station and stores the information in an information processing station which is accessible through a data network. The information processing station makes the GPS satellite information available to roving mobile units equipped with GPS receivers using wireless communication. The satellite information is transmitted either by broadcasting the satellite information through the data network or by transmitting the information through the data network upon demand of the mobile unit. A roving mobile unit, wishing to determine its position, locates the GPS satellites above the horizon using satellite information transmitted by the information processing station through the data network. The mobile unit then acquires the time of arrival information from three or more GPS satellites and acquires other satellite navigation information for the same GPS satellites from the information processing station through the data network. Thus, a roving mobile unit can perform trilateration to determine its position even when the receiver is roaming in a densely built area and is not able to observe the GPS satellites for a sufficient amount of time to acquire the necessary GPS satellite information itself. By making the information processing station accessible by a data network such as the Internet, GPS satellite information collected by the information processing station can be distributed to a large number of roving mobile units using existing communication infrastructure.

In another embodiment, a network of GPS receiving stations is provided to acquire GPS satellite information from all of the 24 GPS satellites in the earth's orbit. The satellite information is collected and stored in the information processing station where the GPS satellite information can be distributed through a data network, such as the Internet, to a large number of users located over a wide geographic areas. The GPS satellite information distribution system of the present invention assists a roving mobile unit in GPS signal acquisition and also improves the sensitivity of the GPS receiver of the mobile unit.

Figure 1:
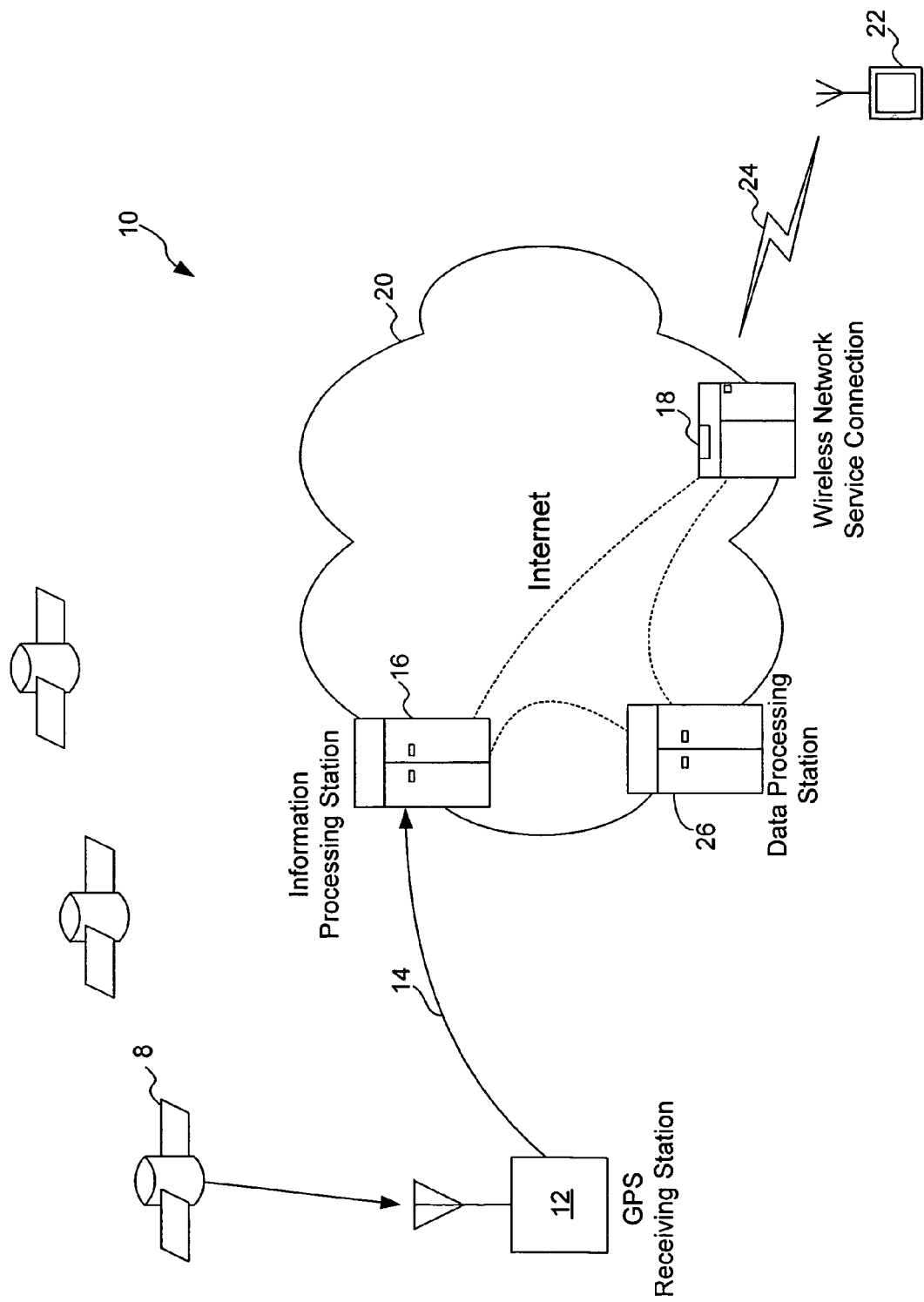
FIG. 1 illustrates a GPS satellite information distribution system according to one embodiment of the present invention.

FIG. 1 illustrates a GPS satellite information distribution system according to one embodiment of the present invention. In the present embodiment, a GPS satellite information distribution system 10 includes a GPS receiving station 12 for receiving satellite information from one or more GPS satellites in the GPS satellite constellation 8. GPS receiving station 12 includes a GPS receiver and a transmitter supporting wired or wireless communication. GPS receiving station 12 is preferably a stationary observation station situated in an open area having an unobstructed view with one or more GPS satellites, and no electromagnetic interference that may compromise the signal received from GPS. Thus, GPS receiving station 12 can receive the GPS satellite signals and the 50-bit-per-second navigation message data stream from one or more of the GPS satellites in constellation 8 continuously without interruption. In the present description, the term "GPS satellite information" refers to the information contained in the GPS navigation message transmitted by the GPS satellites. GPS satellite information includes, but is not limited to, the satellite clock correction factor, the satellite orbital information (ephemeris information), the satellite navigation message including the satellite health status, and the GPS almanac information. In some embodiments, the GPS satellite information may also include the actual navigation bits in the navigation message, the measured Doppler shift information, and the time and frequency information for synchronizing the clock of the GPS receiver to GPS time. In some embodiments, the GPS satellite information also includes differential correction data collected by the GPS receiving station.

GPS satellite information distribution system 10 further includes an information processing station 16, a data network 20 including at least one node 18, and a mobile unit 22. GPS receiving station 12 communicates with information processing station 16 via a data link 14. Data link 14 can be a direct link such as a T1 connection or a wireless link through a cellular network. Data link 14 can also be a connection through the Internet. GPS receiving station 12 transmits the satellite information it acquired from GPS satellite constellation 8 to information processing station 16 for processing and storage. Information processing station 14 is connected to data network 20 such that satellite information collected by GPS receiving station 12 can be distributed to users having access to data network 20. Typically, information processing station 16 includes a database for storing the satellite information.

Data network 20 can be a wide area data network, such as the Internet, or a telephone network, including wired or wireless communications, or both. Wireless communication between the mobile unit and data network can be accomplished, for example, using a cellular digital packet data (CDPD) modem, or a cellular telephone modem. Furthermore, the wireless communication can also use a short message service of a cellular signal structure. Of course, wireless communication between the mobile unit and data network can also be implemented as a FM sub-carrier broadcast. Data network 20 can also be accessed via a satellite link where a communication satellite communicates with a mobile unit through a wireless communication channel. In FIG. 1, data network 20 includes a node 18 which is a wireless network service connection. Satellite information from information processing station 16 on data network 20 can be transmitted to mobile unit 22 through wireless network service connection 18 and wireless communication channel 24.

Mobile unit 22 includes a GPS receiver and a wireless data receiver for receiving data transmission from the data network via wireless communication channel 24. Mobile unit 22 can also include a wireless transmitter for transmitting data to the data network. When required, mobile unit 22 can include a microprocessor for handling the computation of the measured position and other data processing function. In practice, mobile unit 22 can be a navigation device installed in a vehicle or it can be a cellular communication handset equipped with a GPS receiver.

GPS satellite information distribution system 10 of the present invention allows a user of mobile unit 22 to readily obtain satellite information of GPS satellites and accurately determine the mobile unit's position even when the user cannot maintain the mobile unit in view of GPS satellites for a sufficient period of time to acquire the satellite information itself. In the present embodiment, instead of acquiring the necessary satellite information at the GPS receiver of mobile unit 22, information processing station 16 broadcasts the satellite information it received from GPS receiving station 12 through data network 20. Mobile unit 22 receives the broadcast transmission of satellite information from wireless network service connection 18 via wireless communication channel 24. Alternately, information processing station 16 can distribute the satellite information through data network 20 upon demand from mobile unit 22 or on demand from the wireless service provider operating wireless network service connection 18. In that case, mobile unit 22 transmits a data packet to information processing station 16 through data network 20 requesting satellite information for specific GPS satellites at a specified time. Information processing station 16 in turn transmits the requested information through data network 20 to mobile unit 22 on wireless communication channel 24.

In operation, when mobile unit 22 wishes to determine its current position, mobile unit 22 first locates the GPS satellites above the horizon using satellite information transmitted by information processing station 16. For instance, mobile unit 22 can receive the GPS almanac information transmitted by information processing station 16. By using the current GPS almanac information and its last known position, mobile unit 22 can determine which GPS satellites are most likely above the horizon at the moment. To locate the satellites, mobile unit 22 can tune into the predefined frequencies and search only for the C/A-codes of GPS satellites that have been identified as being most likely to be above the horizon.

As described above, GPS signals from only three GPS satellites are needed when two-dimensional position coordinates are of interest. If three-dimensional position coordinates are needed, then GPS signals from at least four GPS satellites are needed. In the following description, the "measured position" of a mobile unit is assumed to be the three-dimensional position coordinates and thus, mobile unit 22 acquires GPS signals from four or more GPS satellites. This is illustrative only and is not intended to be limiting. In other embodiments, when only the two-dimensional position coordinates of mobile unit 22 are of interest, mobile unit 22 acquires GPS signals from three or more GPS satellites.

After mobile unit 22 locates the four or more satellites above the horizon, mobile unit 22 acquires the code sequences (or timing pulses) from the four or more GPS satellites in view in order to obtain the time of arrival information (or the signal travel times of the code sequences). Because the chipping rate of the timing pulses is very fast, only a fraction of a second is needed to acquire the timing pulses. The mobile unit can then compute the pseudo-ranges based on the time of arrival information. To perform trilateration to determine the measured position, the mobile unit also needs the ephemeris information from the same GPS satellites from which the time of arrival information are acquired. As stated above, the code sequences (or timing pulses) include the unique C/A-code for identifying each GPS satellite. In the present embodiment where information processing station 16 broadcasts the satellite information, mobile unit 22 acquires the ephemeris information for the satellites it needs via wireless communication channel 24. In the alternate embodiment where the satellite information is transmitted on demand, mobile unit 22 obtains the satellite information by sending a request to information processing station 16 through wireless network service connection 18. In its request, mobile unit 22 specifies the identification of the four or more GPS satellites of which ephemeris information are needed. Mobile unit 22 also specifies the time for which the ephemeris constants information are needed. Having obtained the ephemeris information via wireless communication link 24, mobile unit 22 can then perform trilateration to determine its measured position. In other embodiments, the satellite information can be distributed on demand from the wireless service provider of wireless network service connection node 18 or other information processing nodes on data network 20.

One advantage of the satellite information distribution system of the present invention is to enable a roving mobile unit to obtain GPS satellite information without the need to acquire the navigation message itself. Thus, even if mobile unit 22 is roaming in a city and is surrounding by tall building structures such that it cannot maintain a direct line-of-sight with the GPS satellites for the necessary observation period (12 to 30 seconds), mobile unit 22 is still able to compute its current position by using updated ephemeris information collected by GPS receiving station 12 and distributed through data network 20 by information processing station 16. In effect, GPS satellite information distribution system 10 of the present invention provides a parallel data link for roving mobile units to obtain updated GPS satellite information.

As described above, the GPS satellite information distribution system of the present invention acquires and distributes GPS satellite information transmitted by the GPS satellites. The satellite information includes the ephemeris information of the satellite which are needed for calculating the measured position of the mobile unit. The satellite information also includes the GPS almanac information for assisting the mobile unit to locate the GPS satellites above the horizon. The satellite information can also include other information contained in the navigation message sent by the GPS satellites, such as the satellite health status information. A mobile unit can determine whether to accept or discard ephemeris information for a particular GPS satellite based the satellite health status information of the satellite distributed by information processing station 16. If the satellite health status information indicates that a particular satellite is not functioning properly, the mobile unit can discard the satellite information for that satellite and seek a replacement satellite. Furthermore, the satellite information can also include the satellite clock correction factor. The mobile unit can use the satellite clock correction factor to compensate for any inaccuracy in the time of arrival information due to errors in the satellite clock.

In one embodiment, the satellite information distribution system of the present invention provides GPS satellite data to mobile units which are compatible with the TIA/EIA/IS-801 standard, entitled *Position Determination Service Standard for Dual-Mode Spread Spectrum Systems* (hereinafter "the IS-801 standard"), promulgated by the Telecommunications Industry Association Subcommittee TR45.5 on *Spread Spectrum Digital Technology—Mobile and Personal Communications Standards*. The IS-801 standard defines a set of messages transmitted between a mobile unit and a base station for providing a position determination service. The IS-801 standard also defines the communication protocol between a mobile GPS receiver and a base station. Of course, the information processing station of the present embodiment can also distribute GPS data using the communication protocol defined by the IS-801 standard.

According to another embodiment of the present invention, an information processing station can be configured to provide the full range of GPS data that are supported by the IS-801 standard. Thus, in addition to the ephemeris information, the GPS almanac information, the satellite health information, and the satellite clock correction factor mentioned above, the information processing station can also acquire and distribute satellite information including but not limited to the actual navigation bits in the navigation message of the GPS signals, the Doppler shift information for the GPS satellites, and time and frequency information for synchronizing the mobile unit's clock to the GPS time.

The actual navigation bits and the Doppler shift information can help to improve the sensitivity of the GPS receiver, particularly when the GPS receiver is trying to acquire weak GPS signals such as when the GPS receiver is inside a building. Knowledge of the actual navigation bits in the navigation messages is helpful because the GPS receiver can increase its averaging time for acquiring the timing pulses. Because the data rate for the navigation message is 50 bits/second, each bit of the navigation message has a duration of 20 milliseconds. Thus, a GPS receiver, having no knowledge of the navigation bit values, must limit its averaging time to a few milliseconds to avoid acquiring a timing pulse spanning a bit boundary of the navigation message. By providing the actual navigation bit values, the GPS receiver of the mobile unit can extend its averaging time for acquiring timing pulses, thus improving the sensitivity of the receiver.

Knowledge of the Doppler shift information can also aid the GPS receiver in extending the averaging time and thus improving its sensitivity. If the Doppler shift information of the GPS satellites is unknown, the GPS receiver has to limit its acquisition time to avoid inaccuracies caused by frequency shifts in the GPS signal. The Doppler shift or frequency offsets include three components: the satellite Doppler offset relative to a fixed user, the frequency offset in the user's clock relative to the GPS time, and the user's dynamics. Typically, the satellite Doppler offset is the largest component and can be as large as 5 kHz. The frequency offset in the user's clock depends on the clock quality and whether or not the mobile unit is synchronized to GPS time by other means. Under the IS-801 standard, the mobile unit is to be synchronized to the GPS time through the CDMA system. Thus, the frequency offset in the user's clock can be minimal. If the user's clock is not synchronized externally, the user's clock can have a typical Doppler offset of 1.5 kHz. Finally, the Doppler shift due to user dynamics varies with the speed of the mobile unit. Most mobile units move slowly so the corresponding Doppler shifts may be a few Hertz.

By providing the full range of GPS data supported by the IS-801 standard, the information processing station of the present invention can provide a mobile unit with signal acquisition assistance and also help to improve the sensitivity of the GPS receiver in the mobile unit. Furthermore, by using a data network such as the Internet to distribute the GPS data, the information processing station can make the GPS data available to a large number of users using existing data network infrastructure.

In another embodiment of the present invention, when it is desirable for mobile unit 22 to use pseudo-ranges in conjunction with differential correction information (or delta-pseudo-ranges) to improve the accuracy of its measured position, GPS satellite information distribution system 10 can also provide differential correction data to mobile units within the system using data network 20. A system and method for using and distributing differential correction data to obtain precise location calculation in a GPS receiver is described in U.S. Pat. No. 5,959,577, issued Sep. 28, 1999, to Fan et al., entitled "Method and Structure for Distribution of Travel Information using Network" ("the '577 patent"). The '577 patent is incorporated by reference in its entirety. In this embodiment, GPS receiving station 12 also functions as a differential correction station as described in the '577 patent. Thus, besides receiving the GPS navigation messages from one or more satellites in view, GPS receiving station 12 also receives the code sequences (or timing pulses) from GPS satellite constellation 8 to obtain a first set of pseudo-ranges based on the received code sequences. Because the position of GPS receiving station 12 is precisely known, GPS receiving station 12 then calculates a second set of pseudo-ranges based on its known position and the relative positions of the satellites in satellite constellation 8. Delta-pseudo-ranges are then computed using the two sets of pseudo-ranges. The delta-pseudo-ranges are used in conjunction with the pseudo-ranges received from satellite constellation 8 to provide a corrected measured position of the mobile unit. Alternatively, correction to the measured position can also be achieved using positional corrections, rather than delta-pseudo-ranges. To obtain a positional correction, GPS receiving station 12 receives GPS positioning code sequences, and obtains, based on the received code sequences, a measured position of its own position expressed in terms of the longitude and latitude. This measured position (called a "fix") is compared to the precisely known position of the GPS receiving station to obtain the positional correction expressed in a delta-longitude quantity and a delta-latitude quantity.

Referring to FIG. 1, when differential correction is incorporated into GPS satellite information distribution system 10, GPS receiving station 12 collects and computes the delta-pseudo-ranges or the positional correction information and transmits the differential correction information via data link 14 to information processing station 16 for processing and storage. The delta-pseudo-ranges or the positional correction information are distributed through data network 20 and wireless network service connection 18 to mobile units serviced by the wireless network. As described, the differential correction data can be broadcasted to all mobile units or it can be transmitted upon demand. Mobile unit 22, upon receipt of the differential correction information, can calculate a corrected measured position of itself using the differential correction information and the ephemeris information received on wireless communication channel 24 and the code sequences received from the GPS satellites in view as described above.

For example, to use the delta-longitude and delta-latitude quantities to find a corrected measured position of mobile unit 22, the pseudo-ranges obtained by mobile unit 22 are first used to trilaterate a measured position to obtain a raw position expressed in a raw longitude and a raw latitude. The corrected longitude for the mobile unit is this raw longitude plus the applicable delta-longitude obtained by the GPS receiving station in the vicinity. Likewise, the corrected latitude is the raw latitude of the mobile unit plus the delta-latitude computed by the GPS receiving station in the vicinity. Of course, satellite information distribution system 10 can also distribute other correction data, such as corrections for clock errors of each GPS satellite and a grid of ionospheric corrections. U.S. Pat. No. 5,621,646 to Enge et al. describes the algorithms for generating the aforementioned corrections in a GPS positioning system. The '646 patent is incorporated herein by reference in its entirety.

In another embodiment of the present invention, GPS satellite information distribution system 10 further includes a data processing station 26. Data processing station 26 can process position information and provide travel related information such as area maps and directions to a nearby restaurant. In that case, mobile unit 22 can forward the pseudo-ranges information it acquired to data processing station 26 and have data processing station 26 computes its corrected measured position. Data processing station 26 is coupled to data network 20 and can, therefore, receive satellite information from information processing station 16 through data network 20. Of course, data processing station 26 and information processing station 16 can be one and the same data processing station on data network 20. After data processing station 26 computes the corrected measured position for mobile unit 22, data processing station 26 can transmit the position information to mobile unit 22 or it can use the position information to provide an area map or other travel-related information to mobile unit 22.

In FIG. 1, GPS satellite information distribution system 10 is illustrated with a single GPS receiving station 12. In this case, a GPS receiving station supports a service area in which the mobile units acquire satellite signals from the same GPS satellites as the receiving station. Typically, a single GPS receiving station serves an area 200 miles in diameter. To expand the service area of GPS satellite information distribution system 10, two or more GPS receiving station can be provided to acquire satellite information from a large number of GPS satellites. In accordance with another embodiment of the present invention, a GPS satellite information distribution system includes a network of GPS receiving stations covering a large geographical area and collects satellite information from several GPS satellites. In one embodiment, a network of GPS receiving station can be installed to cover all of the 24 GPS satellites currently in orbit around the earth. Incorporating a network of GPS receiving stations in the information distribution system has advantages beyond increasing the coverage area of the GPS satellite information distribution system. First, by using a network of GPS receiving stations, information distribution system can guarantee visibility of GPS satellites anywhere within a large geographic area. Second, the reliability of the receiving station network is improved, particularly when at least two GPS receiving stations can be disposed to acquire satellite transmissions from each GPS satellite in orbit. Thus, the continuity and availability of the satellite information distribution system is not affected even when one or a few receiving stations are malfunctioning. A receiving station may malfunction due to equipment failure or due to radio interference at the station. Third, the network of receiving stations can also be used to generate differential corrections that are valid for mobile users disposed over a large service area.

Figure 2:
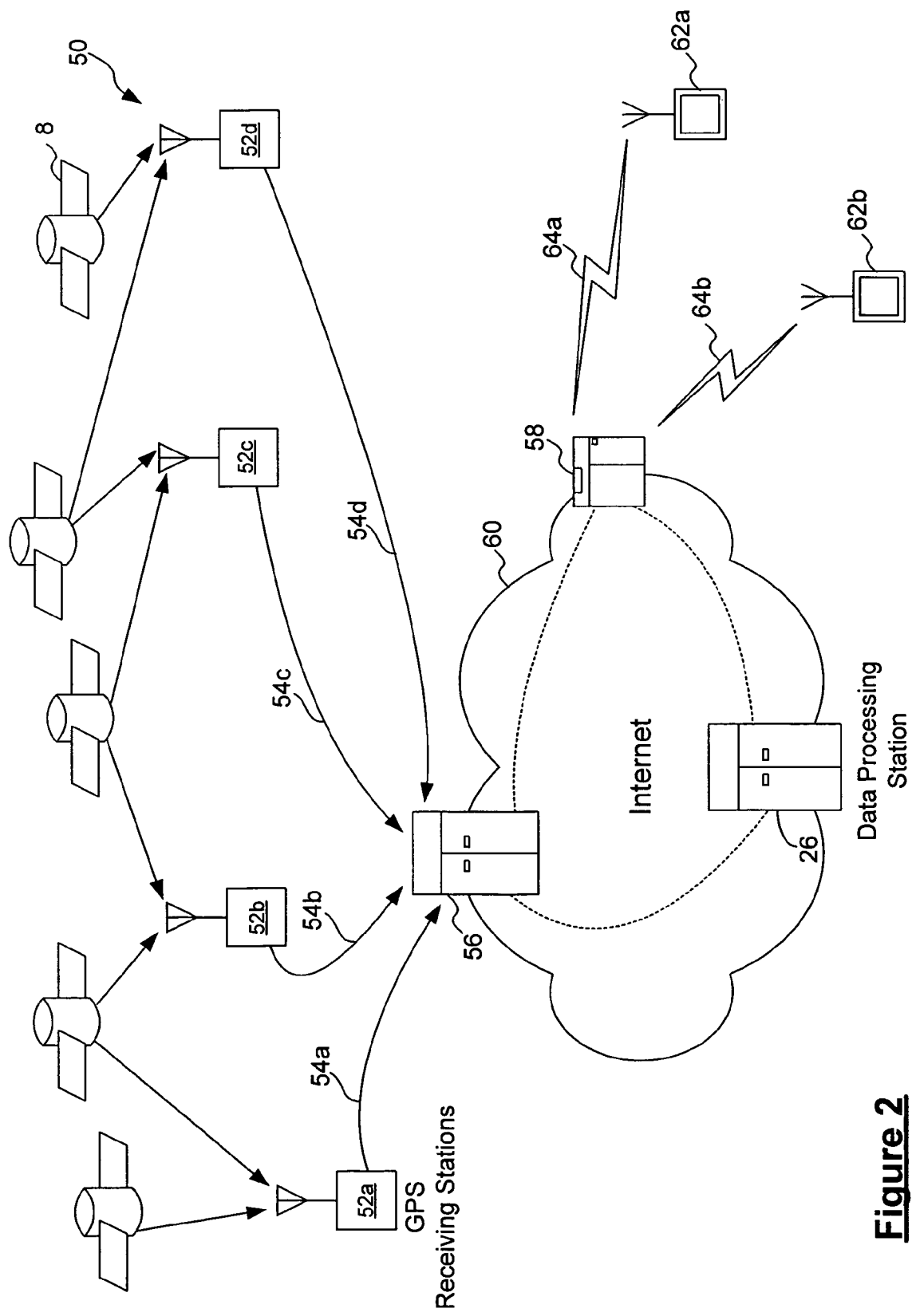
FIG. 2 illustrates a GPS satellite information distribution system including a network of GPS receiving stations according to one embodiment of the present invention.

FIG. 2 illustrates a GPS satellite information distribution system including a network of GPS receiving stations according to one embodiment of the present invention. Referring to FIG. 2, GPS satellite information distribution system 50 includes a network of GPS receiving stations 52a-d, each of the GPS receiving stations acquiring code sequences from one or more satellites in GPS satellite constellation 8. In FIG. 2, four GPS receiving stations are shown. Receiving stations 52a-d of FIG. 2 are illustrative only. Of course, system 50 can include any number of GPS receiving stations as needed to provide the desired area coverage for the system. As described above, in one embodiment, a network of GPS receiving stations is installed to acquire transmissions from all of 24 GPS satellites in orbit. GPS receiving stations 52a-d transmit acquired satellite information via data links 54a-d to an information processing station 56. Each of data links 54a-d can be a direct link such as a T1 connection or a wireless link through a cellular network. Information processing station 56 is connected to a data network 60 and functions as a centralized server, collecting and storing satellite information acquired by GPS receiving stations 52a-d from GPS satellites observed by the GPS receiving stations. In the case when the network of GPS receiving stations covers all of 24 GPS satellites, information processing server 56 stores satellite information for all of the 24 GPS satellites in orbit and thus acts as a data bank of satellite information which can be distributed to users anywhere having access to data network 60. Similar to data network 20, data network 60 can be a wide area data network, such as the Internet, or a telephone network, including wired or wireless communications, or both. Mobile units 62a and 62b can obtain satellite information (such as ephemeris information) from information processing station 56 transmitted through data network 60, wireless network service connection 58 and wireless communication channels 64a-b. Mobile units 62a and 62b can be disposed in a different geographic areas and are observing different GPS satellites. Information processing station 56 can transmit the satellite information to mobile units 62a and 62b either by broadcasting the satellite information through data network 60 or by transmitting upon demand of the mobile units.

Of course, as with system 10, GPS satellite information distribution system 50 can distribute satellite information including the ephemeris information, the navigation message including the satellite health status, the GPS satellite almanac and the satellite clock correction factor. Moreover, GPS satellite information distributed by GPS satellite information distribution system 50 can also be made compatible with the IS-801 standard. GPS satellite information distribution system 50 can acquire and distribute the full range of GPS data supported by the IS-801 standard, including but not limited to the actual navigation bits in the navigation message of the GPS signals, the Doppler shift information for the GPS satellites, and time and frequency information for synchronizing the mobile unit's clock to the GPS time.

According to yet another embodiment of the present invention, GPS satellite information distribution system 50 can incorporate differential correction for improving the accuracy of the measured position determination. In this case, the network of GPS receiving stations also functions as differential correction stations, receiving code sequences (or timing pulses) from GPS satellite constellation 8 for computing the delta-pseudo-ranges or the positional correction data as described above. The differential correction data from all of the GPS receiving stations 52a to 52d are transmitted to and stored at information processing station 56. The differential correction data are distributed to mobile units 62a and 62b in the same manner as the satellite information are distributed.

Figure 3:
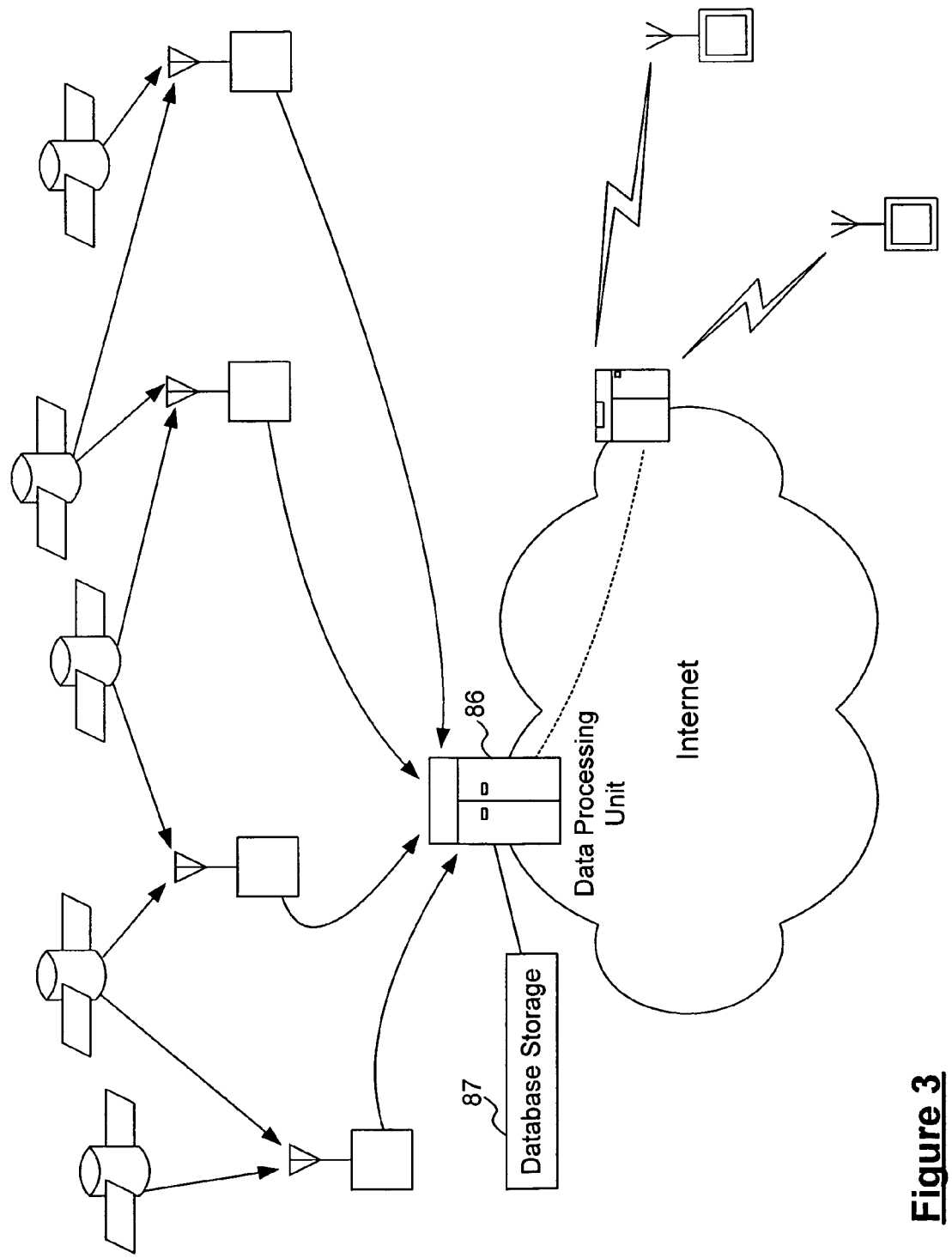
FIG. 3 illustrates a GPS satellite information distribution system including a network of GPS receiving stations according to another embodiment of the present invention.

Furthermore, GPS satellite information distribution system 50 may further include a data processing station 66 connected to data network 60 for providing travel-related services to the mobile units. Data processing station 66 can perform the computation of the measured position or the corrected measured position for mobile units 62a and 62b. Data processing station 66 can further provide area maps or location dependent information to the mobile units. Alternatively, as shown in FIG. 3, a single data process station 86 can be used to process and store the satellite information and the differential correction data in a database storage 87 and also to provide travel-related services to the mobile units. In the embodiments described above, the measured position of the mobile units can be computed either at the mobile units or it can be computed by the data processing station. Furthermore, data processing station 66 or 86 can provide travel-related information after having determined the measured position of the mobile units.

One advantage of the GPS satellite information distribution system of the present invention is that a parallel link is provided to acquire satellite information from GPS satellites in orbit and through the use of a data network such as the Internet, the satellite information can be widely distributed to a large number of users located over a wide geographical area. Furthermore, by providing a data bank of satellite information, an institution such as a law enforcement agency can have access to satellite information necessary to locate a particular person or vehicle equipped with a GPS receiver. For example, if a caller using a cellular telephone equipped with a GPS receiver makes a 911 call, an emergency call center can make use of the broadcast satellite information transmitted by the information processing station and the pseudo-ranges information from the caller's GPS receiver to quickly locate the position of the caller. In another example, a caller using a cellular telephone equipped with a GPS receiver can obtain location dependent information from service providers or data processing stations on the data network. The location dependent information can include nearby gas stations, restaurants or scenic sites.

Moreover, the GPS satellite information distribution system of the present invention obviates the need to install GPS receivers at each cellular base station which can be prohibitively expensive. As described above, providing a GPS receiver at each cellular base station is not a satisfactory solution since each base station can only serve roving GPS receivers near the base station and a large number of GPS receivers need to be installed in a cellular network to provide a wide area coverage. The GPS satellite information distribution system of the present invention can provide a wide service area without a large hardware cost.

The above detailed descriptions are provided to illustrate specific embodiments of the present invention and are not intended to be limiting. Numerous modifications and variations within the scope of the present invention are possible. For example, the information distribution system of the present invention can be used to distribute positioning information provided by positioning systems other than the global positioning system (GPS) mentioned above. In one example, the information distribution system can be used to distribute positioning information provided by a cellular telephone network for performing triangulation based on the cellular telephone network. The present invention is defined by the appended claims.

We claim:

1. A positioning information distribution system comprising:
   a plurality of satellite data receiving stations receiving data from at least one satellite in a positioning system and performing a plurality of satellite specific operations comprising: extracting satellite information, calculating differential correction data relative to its own position, and transmitting satellite specific data including said satellite information and said differential correction data via a data link for each satellite in said positioning system from which data was received;
   an information processing station coupled with said data link, said information processing station receiving a plurality of said satellite specific data transmissions from each of said plurality of satellite data receiving stations, conjoining said plurality of satellite specific data transmissions into a data file comprising satellite information and differential correction data for a plurality of said satellites in said positioning system, and distributing said data file via a network; and
   a mobile unit including a positioning system receiver and a data processing unit, said mobile unit accessing said network and receiving said data file without providing any location information to said information processing station, said mobile unit selecting a portion of said data file correlating to satellites being in line-of-sight of said mobile unit and utilizing said portion of said data file to assist in computing a measured position of said mobile unit.

2. The system of claim 1, wherein said positioning system is a global positioning system (GPS), said positioning system receiver is a GPS receiver and said navigation information is GPS satellite information.

3. The system of claim 1, wherein said information processing station distributes said satellite information by broadcasting said satellite information through said data network; and said mobile unit receives said broadcast satellite information through wireless communication.

4. The system of claim 2, wherein said information processing station distributes said satellite information upon request from said mobile unit and transmits said satellite information through said data network to said mobile unit using wireless communication.

5. The system of claim 2, wherein said satellite information comprises ephemeris information defining the orbital parameters of said GPS satellites.

6. The system of claim 2, wherein said satellite information comprises satellite health information of said GPS satellites.

7. The system of claim 6, wherein said data processing unit discards satellite information received for a first one of said GPS satellites when said satellite health information for said first one of said GPS satellites indicates a malfunctioning status.

8. The system of claim 2, wherein said satellite information comprises satellite almanac information of said GPS satellites.

9. The system of claim 8, wherein said data processing unit provides said satellite almanac information received from said information processing station via said data network to assist in searching for one or more of said GPS satellites above the horizon.

10. The system of claim 2, wherein said satellite information comprises satellite clock correction factors of said GPS satellites.

11. The system of claim 2, wherein said satellite information comprises one or more of the following information: the actual navigation bits of the navigation message transmitted by said GPS satellites, the Doppler shifts information for said GPS satellites, and time and frequency information for synchronizing a clock of said mobile unit to a GPS time.

12. The system of claim 1, wherein said data processing unit receives said satellite information and said differential correction data from said information processing station via said data network.

13. The system of claim 2, wherein said receiving stations are stationary.

14. The system of claim 2, wherein said receiving stations are in direct line-of-sight of one or more GPS satellites continuously and substantially uninterrupted.

15. The system of claim 2, wherein said data link is a wireless data communication link.

16. The system of claim 2, wherein said data link is a direct wired link.

17. The system of claim 16, wherein said data link is a T1 data link.

18. The system of claim 2, wherein said data link is a communication data link through said data network.

19. The system of claim 2, further comprising:
   a wireless network gateway connected to said data network, said gateway providing wireless communication service to said mobile unit; wherein said mobile unit communicates over a wireless data communication link with said gateway for receiving information from said data network.

20. The system of claim 19, wherein said wireless communication service comprises communicating using a packet data structure.

21. The system of claim 19, wherein said wireless communication service comprises communication via a cellular telephone modem.

22. The system of claim 21, wherein said wireless communication service uses a short message service of a cellular communication structure.

23. The system of claim 19, wherein said wireless communication service comprises communication over a satellite data link.

24. The system of claim 2, wherein said data network comprises a publicly shared network such as the Internet.

25. The system of claim 2, wherein said further comprising:
   a data processing station connected to said data network and having access to-a database including maps.

26. The system of claim 25, wherein said data processing station provides area maps to said mobile unit based on said measured position of said mobile unit.

27. The system of claim 25, wherein said data processing station provides travel-related information to said mobile unit based on said measured position of said mobile unit.

28. The system of claim 2, wherein said mobile unit is a cell phone and said information processing station broadcasts said satellite information to said cell phone.

29. The system of claim 28, wherein a user of said mobile unit places a 911 call using said cell phone and determines its position using said broadcast satellite information from said information processing station.

30. The system of claim 28, wherein a user of said mobile unit obtains location-dependent information using said cell phone.

31. A GPS satellite information distribution system comprising:
   a plurality of receiving stations, each including a global positioning system (GPS) receiver and a transmitter, said GPS receiver extracting said GPS satellite information from data from GPS satellites, calculating differential correction data relative to its own position, and transmitting said differential correction data and said GPS satellite information via a data link;

an information processing station coupled with said data link, said information processing station receiving said GPS satellite information and differential correction data from each of said plurality of receiving stations, grouping said GPS satellite information and differential correction data into a data file comprising GPS satellite information and differential correction data for a plurality of said satellites in said positioning system and distributing said data file via a network; and a mobile unit including a GPS receiver and a wireless communicator, said mobile unit receiving said GPS satellite information and said differential correction data from said information processing station via said data network without providing any location information to said information processing station, said mobile unit selecting a portion of said data file correlating to satellites being in line-of-sight of said mobile unit and utilizing said portion of said data file and GPS positioning signals from said GPS satellites through said GPS receiver to compute a measured position of said mobile unit.

32. The system of claim 31, wherein said plurality of receiving stations are disposed to receive GPS satellite information from all of 24 GPS satellites in earth's orbit.

33. The system of claim 31, wherein each of said GPS satellites is observed by at least two of said plurality of receiving stations.

34. The system of claim 31, wherein said mobile unit receives time of arrival information from at least three GPS satellites.

35. The system of claim 31, wherein said information processing station distributes said satellite information by broadcasting said satellite information through said data network; and said mobile unit receives said broadcast satellite information through wireless communication.

36. The system of claim 31, wherein said mobile unit further comprises a wireless transmitter; and said information processing station distributes said satellite information upon request from said mobile unit and transmits said satellite information through said data network to said mobile unit using wireless communication.

37. The system of claim 31, wherein said satellite information comprises ephemeris information defining the orbital parameters of said GPS satellites.

38. The system of claim 37, wherein said mobile unit receives time of arrival information from at least three GPS satellites.

39. The system of claim 31, wherein said satellite information comprises one or more navigation messages transmitted by said GPS satellites.

40. The system of claim 39, wherein said satellite information comprises satellite health information of said GPS satellites.

41. The system of claim 40, wherein said mobile unit discards satellite information received for a first one of said GPS satellites when said satellite health information for said first one of said GPS satellites indicates a malfunctioning status.

42. The system of claim 39, wherein said satellite information comprises satellite almanac information of said GPS satellites.

43. The system of claim 42, wherein said mobile unit uses said satellite almanac information received from said information processing station via said data network for locating one or more of said GPS satellites above the horizon.

44. The system of claim 31, wherein said satellite information comprises satellite clock correction factors of said GPS satellites.

45. The system of claim 31, wherein said satellite information comprises one or more of the following information: the actual navigation bits of the navigation message transmitted by said GPS satellites, the Doppler shifts information for said GPS satellites, and time and frequency information for synchronizing a clock of said mobile unit to a GPS time.

46. The system of claim 31, wherein said mobile unit receives time of arrival information from at least three GPS satellites.

47. The system of claim 31, wherein said plurality of receiving stations are in direct line-of-sight of one or more GPS satellites continuously and substantially uninterrupted.

48. The system of claim 31, wherein said data link is a wireless data communication link.

49. The system of claim 31, wherein said data link is a direct wired link.

50. The system of claim 49, wherein said data link is a T1 data link.

51. The system of claim 31, wherein said data link is a communication data link through said data network.

52. The system of claim 31, wherein said data network comprises a publicly shared network such as the Internet.

53. A method for distributing global positional system (GPS) satellite information over a data network to a mobile unit, comprising:

receiving in a plurality of receiving stations GPS signals transmitted by GPS satellites and extracting from said GPS signals GPS satellite information that is embedded in said GPS signals;

in each receiving station, calculating differential correction data relative to the position of the receiving station;

transmitting said GPS satellite information and said differential data to an information processing station through a data network, said information processing station receiving said GPS satellite information and differential correction data from each of said plurality of receiving stations, grouping said GPS satellite information and differential correction data into a data file comprising GPS satellite information and differential correction data for a plurality of said satellites in said positioning system and distributing said data file via a network; and communicating said GPS satellite information and said differential correction data to a mobile unit through a wireless data link to said data network without providing any information to said information processing station, said mobile unit selecting a portion of said data file correlating to satellites being in line-of-sight of said mobile unit and utilizing portion of said data file having said GPS satellite information and said differential correction data in conjunction with GPS signals of three or more GPS satellites to determine a measured position of said mobile unit.

54. The method of claim 53, wherein said mobile unit determines a time of arrival information based on each of said GPS signals of said three or more GPS satellites.

55. The method of claim 53, wherein said information processing station said satellite information through said data network.

56. The method of claim 53, wherein said GPS satellite information is provided to said mobile unit upon said mobile unit sending a request to said information processing station.

57. The method of claim 53, wherein said plurality of receiving stations receive GPS satellite information from all of 24 GPS satellites in earth orbit.

58. The method of claim 53, wherein each of said GPS satellites is observed by at least two of said plurality of receiving stations.

59. The method of claim 53, wherein said satellite information comprises ephemeris information defining the orbital parameters of said GPS satellites.

60. The method of claim 59, wherein said mobile unit determines a time of arrival information based on each of said GPS signals of said three or more GPS satellites.

61. The method of claim 53, wherein said satellite information comprises one or more navigation messages transmitted by said GPS satellites.

62. The method of claim 61, wherein said satellite information comprises satellite health information of said GPS satellites.

63. The method of claim 62, further comprising:
receiving in said mobile unit said satellite health information transmitted by said information processing station for a first one of said GPS satellites; and
discarding satellite information received in said mobile unit for said first one of said GPS satellites when said satellite health information indicates said first one of said GPS satellites to be malfunctioning.

64. The method of claim 61, wherein said satellite information comprises satellite almanac information of said GPS satellites.

65. The method of claim 64, further comprising:
receiving in said mobile unit said satellite almanac information transmitted by said information processing station; and
locating in said mobile unit a first one of said GPS satellites above the horizon of said mobile unit based on said satellite almanac information.

66. The method of claim 53, wherein said satellite information comprises satellite clock correction factors of said GPS satellites.

67. The method of claim 53, wherein said satellite information comprises one or more of the following information: the actual navigation bits of the navigation message transmitted by said GPS satellites, the Doppler shifts information for said GPS satellites, and time and frequency information for synchronizing a clock of said mobile unit to a GPS time.

* * * * *

UNITED STATES PATENT AND TRADEMARK OFFICE
CERTIFICATE OF CORRECTION

PATENT NO. : 7,574,215 B1 Page 1 of 1
APPLICATION NO. : 09/707326
DATED : August 11, 2009
INVENTOR(S) : Fan et al.

It is certified that error appears in the above-identified patent and that said Letters Patent is hereby corrected as shown below:

Title Page, Item [*] Notice:
Delete the phrase "by 520 days" and insert -- by 793 days --.

Signed and Sealed this

Tenth Day of August, 2010

David J. Kappos
*Director of the United States Patent and Trademark Office*